No. 835,641. PATENTED NOV. 13, 1906.
J. S. SAMS.
ATTACHMENT FOR FERTILIZER SPREADERS.
APPLICATION FILED MAR. 14, 1906.
2 SHEETS—SHEET 1.
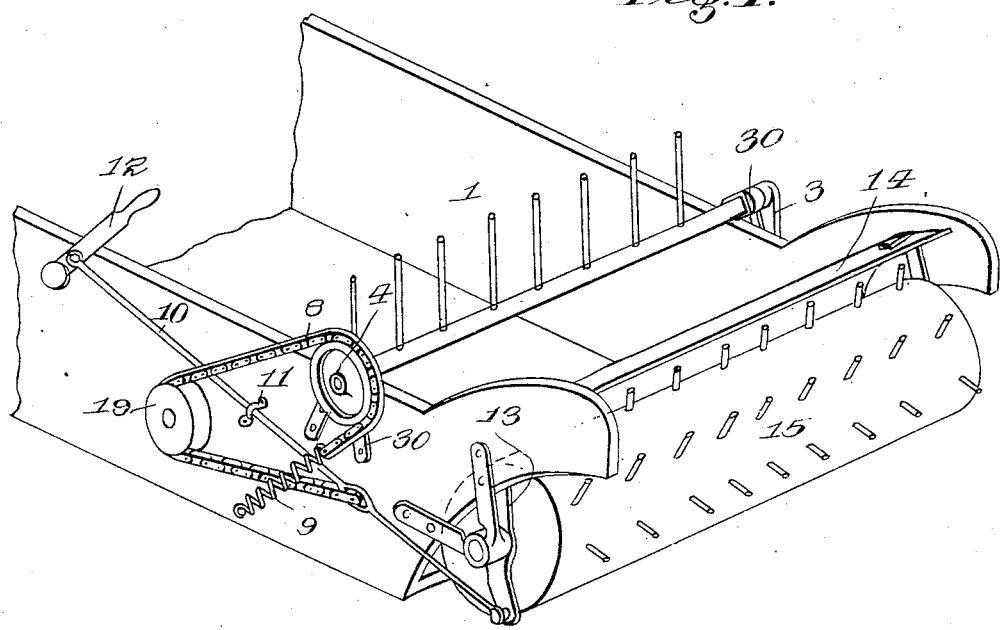
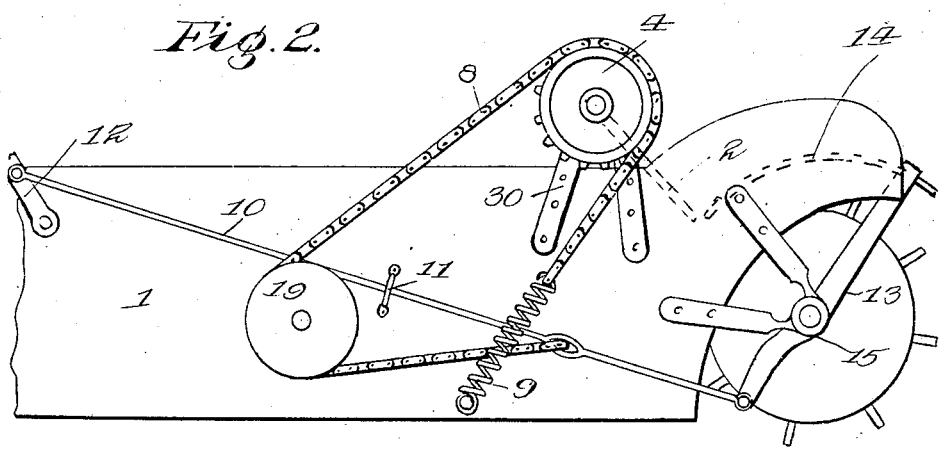

No. 835,641. PATENTED NOV. 13, 1906.
J. S. SAMS.
ATTACHMENT FOR FERTILIZER SPREADERS.
APPLICATION FILED MAR. 14, 1906.
2 SHEETS—SHEET 2.
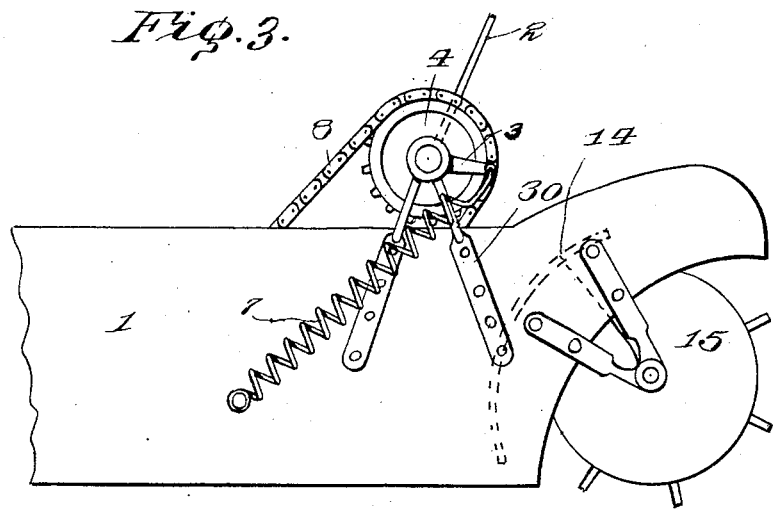
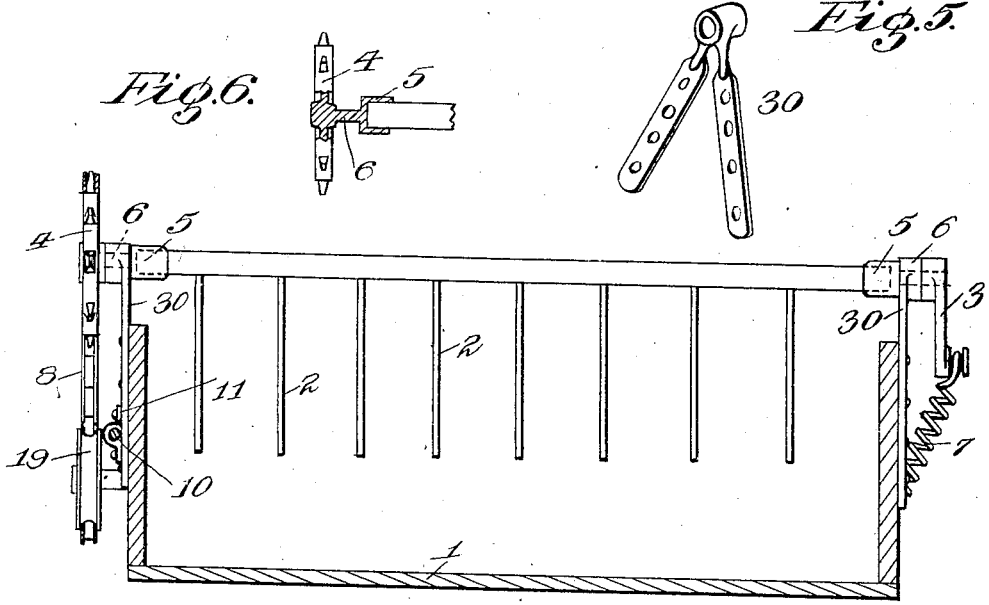
Inventor
J. S. Sams.
Witnesses
By
Attorneys

UNITED STATES PATENT OFFICE.

JAMES S. SAMS, OF WARREN, OHIO.

ATTACHMENT FOR FERTILIZER-SPREADERS.

No. 835,641.   Specification of Letters Patent.   Patented Nov. 13, 1906.

Application filed March 14, 1906. Serial No. 306,049.

*To all whom it may concern:*

Be it known that I, JAMES S. SAMS, a citizen of the United States, residing at Warren, in the county of Trumbull and State of Ohio, have invented certain new and useful Improvements in Attachments for Fertilizer-Spreaders, of which the following is a specification.

This invention relates to an attachment for manure or fertilizer spreaders which is designed to effectively prevent the clogging of the fertilizer as it passes over the spreading mechanism.

The object of the invention is to provide a device of this character which can be readily applied to any of the various types of fertilizer-spreaders in common use and which is at the same time very simple and durable in construction.

The invention consists, essentially, of a vibrating feed-regulator which is held in a yielding engagement with the fertilizer, so as to cause the same to feed evenly and prevent any clogging thereof.

For a full description of the invention and the merits thereof, and also to acquire a knowledge of the details of construction of the means for effecting the result, reference is to be had to the following description and accompanying drawings, in which—

Figure 1 is a perspective view showing the attachment applied to the body of a fertilizer-distributer. Fig. 2 is a side elevation of the same. Fig. 3 is a similar view of the opposite side of the device. Fig. 4 is a transverse sectional view through the body of the distributer. Fig. 5 is a detail perspective view of one of the standards, and Fig. 6 is a sectional view through the operating-wheel.

Corresponding and like parts are referred to in the following description and indicated in all the views of the drawings by the same reference characters.

The numerals 1 designates the body of a wagon equipped with any of the conventional types of fertilizer-distributers. In the present instance the vibrating feed-regulator is in the form of a rake-head 2, which is pivotally mounted upon the body of the wagon 1 and which is held in a yielding engagement with the fertilizer as it passes over the spreading-drum 15. This rake-head 2 comprises, essentially, a shaft which is mounted between the upright standards 30, secured upon opposite sides of the wagon-body 1, and which is provided with the laterally-extending tines, forming the teeth of the rake-head and normally engaging with the fertilizer, as has been before mentioned. One end of the shaft is provided with a crank-arm 3, while the opposite end is provided with the operating-wheel 4. In the preferred construction both the crank 3 and the wheel 4 are secured to the ends of the shaft by means of cup members 5, which embrace the same and are formed with shanks 6, which pass through the openings in the standards 30 and which serve as the pivots upon which the rake-head is mounted. The crank 3 is connected to one end of a spring member 7, the opposite end of which is rigidly connected to the body of the wagon. This spring member 7 is so arranged as to normally hold the rake-head in engagement with the fertilizer as it passes over the spreading-drum 15.

A chain or flexible member 8 passes around the operating-wheel 4 and has its rear end connected to a second spring member 9, which is also secured directly to the body of the wagon and which also operates to hold the rake-head in a yielding engagement with the fertilizer. The opposite end of the flexible member 8 passes around a pulley 19, which is mounted upon the side of the wagon and is secured to the rod 10. This rod 10 is slidably mounted upon the body of the wagon by means of a keeper 11 and has its forward end connected directly to the hand-lever 12, while the rear end is connected to the lever 13, by means of which the hood 14 is operated.

The hood 14 and chain 8 are preferably so connected to the rod 10 that the hood and rake-head are alternately thrown into operative position—that is, when the hood 14 is lowered in position for loading the wagon, so that it keeps the fertilizer from packing against the distributing-drum 15, the rake-head 2 is turned upwardly, as seen in Fig. 1, and when the hand-lever 12 is pulled forward to lift the hood 14 and allow the fertilizer to be distributed by the drum 15 the rake-head 2 is automatically brought into engagement with the drum 15, as shown in Fig. 2.

In the operation of the device the springs 7 and 9 normally hold the rake-head in a yielding engagement with the fertilizer passing over the drum 15, and the tines of the rake-head have a certain vibratory movement which causes them to prevent the fertilizer from clogging and to cause the same to feed evenly over the spreading mechanism. If for any reason it should become desirable to swing the rake-head out of operative position or to decrease the pressure with which they bear upon the fertilizer, the desired result can be readily accomplished by operating the hand-lever 12. When the rake-head 2 is swung upwardly, it will be apparent that the hood 14 will be automatically lowered, so as to hold the fertilizer in the body of the wagon out of contact with the distributing-drum 15.

Having thus described the invention, what is claimed as new is—

1. The combination of a fertilizer-distributer, a shaft mounted upon the same, a vibrating regulator connected to the shaft, an operating-wheel secured to the shaft, a flexible member over the operating-wheel, one end of which is connected to a spring member which normally holds the vibrating feed-regulator in a yielding engagement with the fertilizer, and means connected to the opposite end of the cable whereby the feed-regulator can be swung out of operative position.

2. The combination of a fertilizer-distributer, a shaft mounted thereon, a vibrating feed-regulator connected to the shaft, an operating-wheel mounted upon the shaft, a flexible member passing around the operating-wheel, a spring member secured to one end of the flexible member, a lever, and connecting means between the opposite end of the flexible member and the lever whereby the feed-regulator can be swung out of operative position.

3. The combination of a fertilizer-distributer, a shaft mounted thereon, a vibrating feed-regulator secured to the shaft, an operating-wheel mounted upon the shaft, a flexible member around the operating-wheel, a spring connected to one end of the flexible member and operating to hold the feed-regulator in a yielding engagement with the fertilizer as it passes over the spreading-drum, a pulley mounted upon the fertilizer-distributer and around which the opposite end of the flexible member passes, a lever, and connecting means between the lever and the flexible member whereby the feed-regulator can be thrown out of operative position.

4. The combination of a fertilizer-distributer, a shaft mounted thereon, a vibrating feed-regulator secured to the shaft, an operating-wheel mounted upon the shaft, a flexible member passing around the operating-wheel, a spring connected to one end of the flexible member and operating to hold the feed-regulator in a yielding engagement with the fertilizer as it passes over the spreading-drum, a pulley mounted upon the fertilizer-distributer and around which the opposite end of the flexible member passes, a lever, and a rod slidably mounted upon the body of the fertilizer-distributer, the said rod connecting the lever and the flexible member so that the feed-regulator can be thrown out of operative position by operating the lever.

In testimony whereof I affix my signature in presence of two witnesses.

JAMES S. SAMS. [L. S.]

Witnesses:
GEO. T. HECKLINGER,
M. HECKLINGER.